US010302761B1

(12) United States Patent
Woodell et al.

(10) Patent No.: US 10,302,761 B1
(45) Date of Patent: May 28, 2019

(54) SYSTEM AND METHOD FOR TURBULENCE DETECTION

(71) Applicant: Rockwell Collins, Inc., Cedar Rapids, IA (US)

(72) Inventors: Daniel L. Woodell, Cedar Rapids, IA (US); Jeffery A. Finley, Cedar Rapids, IA (US); Gregory J. Koenigs, Cedar Rapids, IA (US); John G. Conkling, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 221 days.

(21) Appl. No.: 15/213,256

(22) Filed: Jul. 18, 2016

Related U.S. Application Data

(60) Division of application No. 13/717,052, filed on Dec. 17, 2012, now Pat. No. 9,395,438, which is a continuation of application No. 12/075,103, filed on Mar. 7, 2008, now Pat. No. 8,902,100.

(51) Int. Cl.
| | | |
|---|---|---|
| *G01S 13/95* | (2006.01) | |
| *B64D 43/00* | (2006.01) | |
| *G01S 7/04* | (2006.01) | |
| *B64D 45/00* | (2006.01) | |
| *G01S 13/00* | (2006.01) | |

(52) U.S. Cl.
CPC ............ *G01S 13/953* (2013.01); *B64D 43/00* (2013.01); *B64D 45/00* (2013.01); *G01S 7/04* (2013.01)

(58) Field of Classification Search
CPC ........ G01S 13/953; G01S 7/04; G01S 13/951; B64D 43/00; B64D 45/00; G01W 1/00
See application file for complete search history.

(56) References Cited

U.S. PATENT DOCUMENTS

| | | | |
|---|---|---|---|
| 650,275 | A | 5/1900 | Reeve |
| 3,251,057 | A | 5/1966 | Buehler et al. |
| 3,359,557 | A | 12/1967 | Fow et al. |
| 3,404,396 | A | 10/1968 | Buchler et al. |
| 3,465,339 | A | 9/1969 | Marner |

(Continued)

FOREIGN PATENT DOCUMENTS

| | | | |
|---|---|---|---|
| EP | 1 329 738 B1 | 7/2003 | |
| FR | 2658617 A1 * | 8/1991 | .............. G01W 1/00 |

(Continued)

OTHER PUBLICATIONS

Entry for the word, "gradient" at Wolfram MathWorld, at mathworld.wolfram.com. Accessed on Oct. 16, 2018. (Year: 2018).*

(Continued)

*Primary Examiner* — Bernarr E Gregory
(74) *Attorney, Agent, or Firm* — Donna P. Suchy; Daniel M. Barbieri

(57) ABSTRACT

An aircraft hazard warning system or method can be utilized to determine a location of turbulence, hail or other hazard for an aircraft. The aircraft hazard warning system can utilize processing electronics coupled to an antenna. The processing electronics can determine an inferred presence of turbulence in response to lightning sensor data, radar reflectivity data, turbulence data, geographic location data, vertical structure analysis data, and/or temperature data. The system can include a display for showing the turbulence hazard and its location.

15 Claims, 8 Drawing Sheets

(56) References Cited

U.S. PATENT DOCUMENTS

| | | |
|---|---|---|
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,660,038 A * | 4/1987 | Greneker, III ......... G01S 13/951 342/26 D |
| 4,684,950 A | 8/1987 | Long |
| 4,742,353 A | 5/1988 | D'Addio et al. |
| 4,761,650 A | 8/1988 | Masuda et al. |
| 4,803,470 A | 2/1989 | Fineman |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,095,754 A | 3/1992 | Hsu et al. |
| 5,130,712 A * | 7/1992 | Rubin .................. G01S 13/951 342/26 D |
| 5,159,407 A | 10/1992 | Churnside et al. |
| 5,164,731 A | 11/1992 | Borden et al. |
| 5,173,704 A | 12/1992 | Buehler et al. |
| 5,175,551 A * | 12/1992 | Rubin .................. G01S 13/951 342/26 D |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,262,773 A | 11/1993 | Gordon |
| 5,262,782 A * | 11/1993 | Rubin .................. G01S 13/951 342/26 D |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 5,974,875 A * | 11/1999 | Leslie .................. G01W 1/00 73/170.07 |
| 6,000,285 A * | 12/1999 | Leslie .................. G01W 1/00 73/170.07 |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,118,382 A | 9/2000 | Hibbs et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,237,405 B1 * | 5/2001 | Leslie .................. G01W 1/00 73/170.07 |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,320,511 B1 | 11/2001 | Cronin et al. |
| 6,340,946 B1 | 1/2002 | Wolfson et al. |
| 6,377,202 B1 | 4/2002 | Kropfli et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |

(56) References Cited

U.S. PATENT DOCUMENTS

| | | |
|---|---|---|
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 * | 12/2007 | Koenigs ............... G01S 13/953 342/26 R |
| 7,307,577 B1 | 12/2007 | Kronfeld et al. |
| 7,307,583 B1 | 12/2007 | Woodell et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,417,578 B1 | 8/2008 | Woodell et al. |
| 7,417,579 B1 | 8/2008 | Woodell |
| 7,427,943 B1 | 9/2008 | Kronfeld et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,921 B1 | 4/2010 | Finley et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,917,255 B1 | 3/2011 | Finley |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,111,186 B2 | 2/2012 | Bunch et al. |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B1 | 11/2012 | Musiak et al. |
| 8,902,100 B1 | 12/2014 | Woodell et al. |
| 2002/0039072 A1 | 4/2002 | Gremmert et al. |
| 2003/0001770 A1 | 1/2003 | Cornell et al. |
| 2003/0025627 A1 * | 2/2003 | Wilson ............... G01S 13/951 342/26 D |
| 2003/0117311 A1 | 6/2003 | Funai |
| 2004/0239550 A1 | 12/2004 | Daly, Jr. |
| 2005/0049789 A1 | 3/2005 | Kelly et al. |
| 2006/0036366 A1 | 2/2006 | Kelly et al. |
| 2007/0152867 A1 | 7/2007 | Randall |
| 2008/0158049 A1 | 7/2008 | Southard et al. |
| 2009/0219197 A1 | 9/2009 | Bunch |
| 2010/0019938 A1 | 1/2010 | Bunch |
| 2010/0042275 A1 | 2/2010 | Kirk |
| 2010/0110431 A1 | 5/2010 | Ray et al. |
| 2010/0194628 A1 | 8/2010 | Christianson et al. |
| 2010/0201565 A1 | 8/2010 | Khatwa |
| 2011/0148694 A1 | 6/2011 | Bunch et al. |
| 2012/0133551 A1 | 5/2012 | Pujol et al. |
| 2012/0139778 A1 | 6/2012 | Bunch et al. |
| 2013/0234884 A1 | 9/2013 | Bunch et al. |

FOREIGN PATENT DOCUMENTS

| | | |
|---|---|---|
| FR | 2658617 A1 | 8/1991 |
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

Entry for the word, "gradient" at Britannica Academic, at acadennic.eb.com. Accessed on Oct. 16, 2018. (Year: 2018).*

U.S. Appl. No. 12/075,103, filed Mar. 7, 2008, Woodell et al.

U.S. Appl. No. 13/841,893, filed Mar. 15, 2013, Rockwell Collins, Inc.

U.S. Appl. No. 13/919,406, filed Jun. 17, 2013, Rockwell Collins, Inc.

U.S. Appl. No. 14/086,844, filed Nov. 21, 2013, Rockwell Collins, Inc.

U.S. Appl. No. 14/206,239, filed Mar. 12, 2014, Rockwell Collins.

U.S. Appl. No. 14/206,651, filed Mar. 12, 2014, Rockwell Collins, Inc.

U.S. Appl. No. 14/207,034, filed Mar. 12, 2014, Rockwell Collins, Inc.

3-D Weather Hazard and Avoidance System, Honeywell InteVue Brochure dated Nov. 2008, 4 pages.

Advisory Action for U.S. Appl. No. 12/075,103, dated Feb. 13, 2013, 3 pages.

Advisory Action for U.S. Appl. No. 12/075,103, dated Nov. 8, 2010, 3 pages.

Advisory Action for U.S. Appl. No. 12/075,103, dated Oct. 15, 2010, 3 pages.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), www.ll.mit.edu/mission/aviation/faawxsystems/ciws.html, 2008, 3 pages.

Decision on Appeal for Inter Parties Reexamination Control No. 95/001,860, dated Oct. 17, 2014, 17 pages.

Doviak et al., Doppler Radar and Weather Observations, 1984, 298 pages.

Final Office Action on U.S. Appl. No. 12/892,663 dated Mar. 7, 2013, 13 pages.

Final Office Action on U.S. Appl. No. 13/238,606 dated Apr. 1, 2014, 11 pages.

Final Office Action on U.S. Appl. No. 13/238,606 dated Jan. 22, 2015, 6 pages.

(56) References Cited

OTHER PUBLICATIONS

Final Office Action on U.S. Appl. No. 13/246,769 dated Sep. 16, 2014, 18 pages.
Final Office Action on U.S. Appl. No. 13/717,052, dated Nov. 13, 2015, 10 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003, 106 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Sep. 23, 2013, 15 pages.
Non-Final Office Action on U.S. Appl. No. 13/717,052 dated Feb. 11, 2015, 15 pages.
Non-Final Office Action on U.S. Appl. No. 13/717,052 dated Sep. 9, 2014, 8 pages.
Non-Final Office Action on U.S. Appl. No. 13/841,893 dated Jun. 22, 2015, 27 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Non-Final Office Action on U.S. Appl. No. 14/206,239 dated Jun. 16, 2016, 12 pages.
Non-Final Office Action on U.S. Appl. No. 14/206,651 dated Jun. 23, 2016, 12 pages.
Non-Final Office Action on U.S. Appl. No. 14/207,034 dated Jun. 23, 2016, 14 pages.
Notice of Allowance for U.S. Appl. No. 10/631,253, dated Jul. 28, 2005, 7 pages.
Notice of Allowance for U.S. Appl. No. 11/256,845, dated May 27, 2009, 7 pages.
Notice of Allowance for U.S. Appl. No. 11/370,085, dated Dec. 30, 2008, 6 pages.
Notice of Allowance for U.S. Appl. No. 11/402,434, dated Nov. 4, 2008, 6 pages.
Notice of Allowance for U.S. Appl. No. 12/474,102, dated Jan. 20, 2012, 6 pages.
Notice of Allowance on U.S. Appl. No. 12/075,103 dated Aug. 4, 2014, 10 pages.
Notice of Allowance on U.S. Appl. No. 13/246,769 dated Jan. 8, 2015, 10 pages.
Notice of Allowance on U.S. Appl. No. 13/707,438 dated Feb. 25, 2015, 11 pages.
Notice of Allowance on U.S. Appl. No. 13/717,052 dated Mar. 18, 2016, 8 pages.
Office Action for U.S. Appl. No. 11/256,845, dated Aug. 21, 2007, 4 pages.
Office Action for U.S. Appl. No. 10/631,253, dated Jan. 14, 2004, 5 pages.
Office Action for U.S. Appl. No. 10/631,253, dated Jun. 30, 2004, 4 pages.
Office Action for U.S. Appl. No. 11/256,845, dated Dec. 5, 2006, 5 pages.
Office Action for U.S. Appl. No. 11/256,845, dated Jul. 28, 2008, 5 pages.
Office Action for U.S. Appl. No. 11/256,845, dated Jun. 22, 2006, 5 pages.
Office Action for U.S. Appl. No. 11/370,085, dated Aug. 15, 2007, 10 pages.
Office Action for U.S. Appl. No. 11/370,085, dated Dec. 4, 2007, 13 pages.
Office Action for U.S. Appl. No. 11/370,085, dated Oct. 9, 2008, 5 pages.
Office Action for U.S. Appl. No. 11/402,434, dated Jul. 17, 2008, 5 pages.
Office Action for U.S. Appl. No. 11/402,434, dated Mar. 29, 2007, 8 pages.
Office Action for U.S. Appl. No. 11/402,434, dated Oct. 26, 2006, 7 pages.
Office Action for U.S. Appl. No. 11/402,434, dated Sep. 20, 2007, 7 pages.
Office Action for U.S. Appl. No. 12/075,103, dated Feb. 26, 2010, 11 pages.
Office Action for U.S. Appl. No. 12/075,103, dated Jul. 29, 2010, 7 pages.
Office Action for U.S. Appl. No. 12/075,103, dated Jun. 20, 2012, 5 pages.
Office Action for U.S. Appl. No. 12/075,103, dated Nov. 29, 2012, 6 pages.
Office Action for U.S. Appl. No. 12/474,102, dated Sep. 7, 2011, 8 pages.
Office Action for U.S. Appl. No. 12/892,663, dated Oct. 22, 2012, 12 pages.
Office Action for U.S. Appl. No. 13/717,052, dated Aug. 22, 2013, 15 pages.
Office Action on U.S. Appl. No. 12/075,103 dated Apr. 9, 2014, 5 pages.
Office Action on U.S. Appl. No. 13/246,769 dated Apr. 21, 2014, 18 pages.
Office Action on U.S. Appl. No. 13/717,052 dated Dec. 23, 2013, 7 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, 2008, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Office Action on U.S. Appl. No. 13/717,052 dated Mar. 27, 2014, 6 pages.
Waldvogel et al., The Kinetic Energy of Hailfalls. Part I: Hailstone Spectra, Journal of Applied Meteorology, Apr. 1978, 8 pages.
Zipser et al., The Vertical Profile of Radar Reflectivity and Convective Cells: A Strong Indicator of Storm Intensity and Lightning Probability? America Meteorological Society, Aug. 1994, 9 pages.
Non-Final Office Action for U.S. Appl. No. 15/157,368 dated Dec. 12, 2018. 18 pages.

* cited by examiner

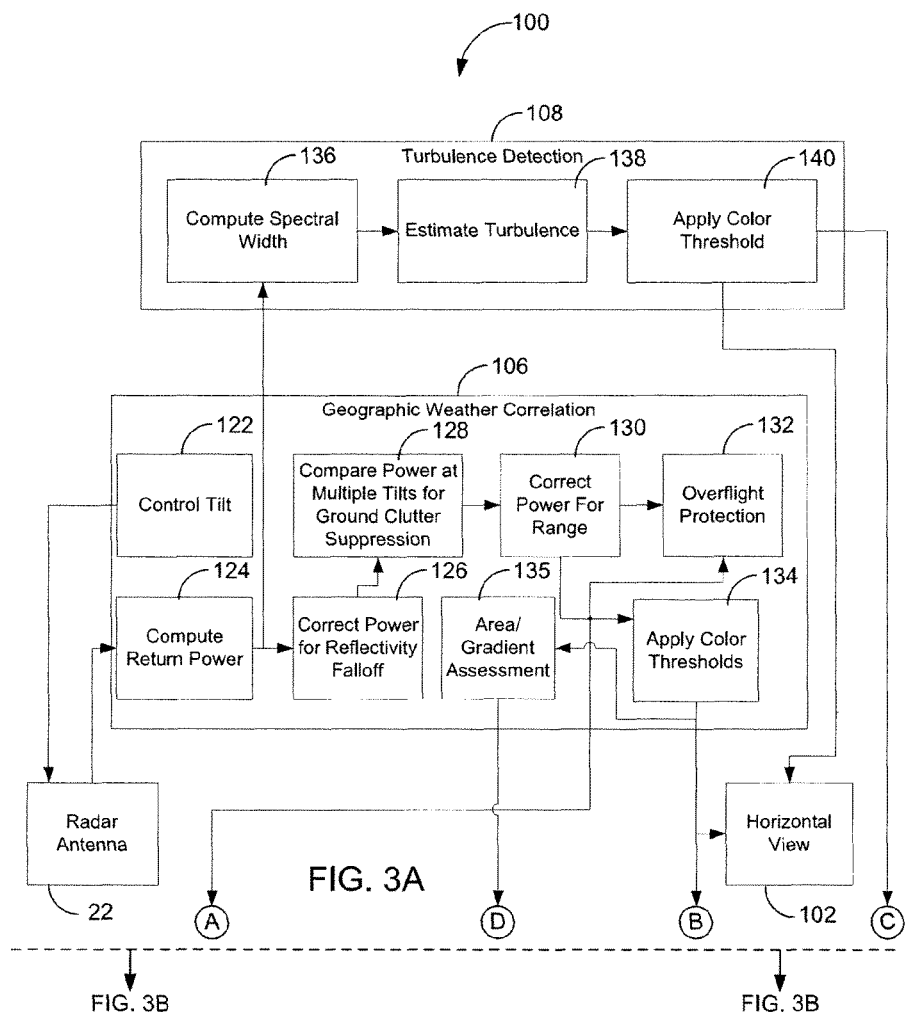

SYSTEM AND METHOD FOR TURBULENCE DETECTION

CROSS-REFERENCE TO RELATED PATENT APPLICATIONS

The present application claims the benefit of and priority to and is a divisional of U.S. patent application Ser. No. 13/717,052, filed Dec. 17, 2012, now U.S. Pat. No. 9,395, 438, entitled "SYSTEM AND METHOD FOR TURBULENCE DETECTION" by Woodell et al., which is a continuation of U.S. patent application Ser. No. 12/075,103, filed Mar. 7, 2008, now U.S. Pat. No. 8,902,100, entitled "SYSTEM AND METHOD FOR TURBULENCE DETECTION" by Woodell et al., each of which are incorporated herein by reference in their entirety and for all purposes. U.S. patent application Ser. No. 11/370,085, filed Mar. 7, 2006, now U.S. Pat. No. 7,515,087; U.S. patent application Ser. No. 11/402,434, filed Apr. 12, 2006, now U.S. Pat. No. 7,486,219; U.S. patent application Ser. No. 11/256,845, filed Oct. 24, 2005, now U.S. Pat. No. 7,598,902; and U.S. patent application Ser. No. 10/631,253, filed Jul. 31, 2003, now U.S. Pat. No. 7,129,885 are herein incorporated by reference in their entireties.

BACKGROUND

This application relates generally to the identification of turbulence. More particularly, this application relates to the identification of turbulence by analysis of convective cells detected by aircraft hazard warning systems.

Hazardous weather is generally associated with convective weather cells. Convective weather cells can produce turbulence, high winds, lightning, hail, and other weather hazards. With the large amount of air traffic and rising fuel costs, pilots are interested in identifying convective cells (e.g., often hazardous weather) from non-convective cells (e.g., stratiform rain) so they do not unnecessarily avoid flight routes through non-hazardous weather. Convective cells can also provide dangerous and uncomfortable flight conditions for the crew and passengers.

Lightning is generally caused when mixed state hydrometeors rub together in vertical shearing regions inside convective cells. Generally, cells that are producing lightning are turbulent and have the capacity to produce hail. Therefore, the presence of lightning in a particular area can be an indication of the presence of a convective cell or at least a potentially hazardous weather region.

Weather radar systems generally include an antenna, a receiver/transmitter circuit, a processor, and display. The processor is coupled between the display and the receiver/transmitter circuit. The receiver/transmitter circuit is coupled between the processor and the antenna. The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color display providing graphical images in color to represent the severity of weather. Some aircraft systems also include other hazard warning systems such as a turbulence detection system. The turbulence detection system can provide indications of the presence of turbulence or other hazards.

Conventional aircraft hazard weather radar systems, such as the WXR 2100 MultiScan™ radar system manufactured by Rockwell Collins, Inc., have Doppler capabilities and are capable of detecting four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta.

Although radar-detected reflectivity and radar-detected velocity variation are correlated to aircraft hazards, they may not provide a complete picture to the pilot. For example, rainfall rates derived from radar reflectivity data are generally related to the most visible weather related advisory on the flight deck. However, heavy rain is not inherently hazardous to the aircraft. Heavy rain is displayed to the flight crew because it is often associated with true weather hazards such as lightning, hail, and turbulence.

Some weather radar systems incorporate turbulence detection functions. In areas of reasonably high reflectivity, conventional aircraft hazard warning systems can detect variation in the velocity signatures within thunderstorms. This velocity variation, or spectral width in radar terminology, is correlated to turbulence within the storm. Conventional turbulence detection algorithms have limitations, however. Direct radar based turbulence detection systems typically have a short range, for example up to about forty or fifty nautical miles. Forty nautical miles is a relatively short distance when air crews are trying to maneuver near storm cells. In addition, turbulence thresholds are typically set so high to adhere to regulatory agencies that the turbulence is only visible in the cores of convective cells, areas which aircrews avoid anyway due to very high (red) reflectivity. A conventional turbulence detector has generally been incapable of adjusting with respect to geographic location.

Thus, there is a need for a system and method for more accurate, long range detection of turbulence. There is also a need for inferring the existence of turbulence based on the detection and analysis of convective cells or hazards associated therewith. There is also a need to detect and locate turbulent weather cells as opposed to non-turbulent, isolated cells. Further still, there is a need to detect and locate turbulent convective cells as opposed to non-turbulent convective cells. Yet further, there is a need for an aircraft hazard warning system optimized to determine the location and presence of turbulent cells. Further, there is a need for an aircraft hazard warning system that includes more functions than a conventional rain gauge.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to an aircraft hazard warning system. The aircraft hazard warning system includes an input for receiving lightning detection data, radar reflectivity data, turbulence data, geographic location data, vertical structure analysis data, and/or temperature data. The aircraft hazard warning system also includes a processing system for determining a presence of turbulence. The processing system receives the lightning detection data, radar reflectivity data, turbulence data, geographic location data, vertical structure analysis data, and/or temperature data. The processing system performs inferential turbulence detection in response to at least one of the lightning detection data, radar reflectivity data, turbulence data, geographic location data, vertical structure analysis data, and temperature data.

Another embodiment of the disclosure relates to a method of displaying an indication of a hazard on an aircraft display in an avionics system. The method includes the step of receiving lightning detection data, radar reflectivity data, turbulence data, geographic location data, vertical structure analysis data, and/or temperature data. The method also includes the steps of receiving radar returns, providing a first turbulence assessment in response to the radar returns, and providing an inferential turbulence detection assessment in response to the lightning sensor data, radar reflectivity data, turbulence data, geographic location data, vertical structure analysis data, and/or temperature data. The method also includes the step of providing the indication using the inferential turbulence detection assessment and the first turbulence assessment.

Another embodiment of the disclosure relates to an apparatus for determining a presence of a hazard for an aircraft. The apparatus includes means for providing a first turbulence assessment in response to radar returns. The apparatus also includes means for providing an inferential turbulence detection assessment in response to lightning sensor data, radar reflectivity data, turbulence data, geographic location data, vertical structure analysis data, and/or temperature data. The apparatus also includes means for causing a display to provide an indication of the presence of turbulence using the inferential turbulence detection assessment and the first turbulence assessment.

Another embodiment relates to an aircraft hazard warning system. The system includes an input for radar reflectivity data and temperature data, and a processing system. The processing system determines a presence of hail. The processing system receives the radar reflectivity data, and the temperature data. The processing system determines a first altitude associated with the zero degree centigrade point and the presence of hail when the reflectivity data indicates a reflectivity at a second altitude above the first altitude is above a first threshold.

Another embodiment relates to method of displaying an indication of a hazard on an aircraft display in an avionics system. The method including receiving lightning detection data, radar reflectivity data, turbulence data, geographic location data, vertical structure analysis data, and/or temperature data, providing a first turbulence assessment in response to a spectral width parameter associated with the radar returns, the method also includes providing an inferential turbulence detection assessment in response to the lightning sensor data, radar reflectivity data, turbulence data, geographic location data, vertical structure analysis data, and/or temperature data, and providing the indication using the inferential turbulence detection assessment and the first turbulence assessment.

Another exemplary embodiment relates to an apparatus for determining a presence of a convective cell or turbulence in an environment of an aircraft. The apparatus includes an input for radar reflectivity data, and a processing system for determining the presence of the convective cell or turbulence. The processing system receives the radar reflectivity data and uses gradients in the radar reflectivity to determining the presence of the convective cell.

Another exemplary embodiment relates to an aircraft hazard warning system. The aircraft warning system includes an input for radar reflectivity data, and a processing system for determining a presence of turbulent bow wave in response to storm growth rate determined using the reflectivity data.

BRIEF DESCRIPTION OF THE DRAWINGS

The invention will become more fully understood from the following detailed description, taken in conjunction with the accompanying drawings, wherein like reference numerals refer to like elements, in which:

FIGS. 3A and 3B are a more detailed version of the functional flow diagram of FIG. 2 according to an exemplary embodiment.

DETAILED DESCRIPTION OF THE EXEMPLARY EMBODIMENTS

Figure 1:
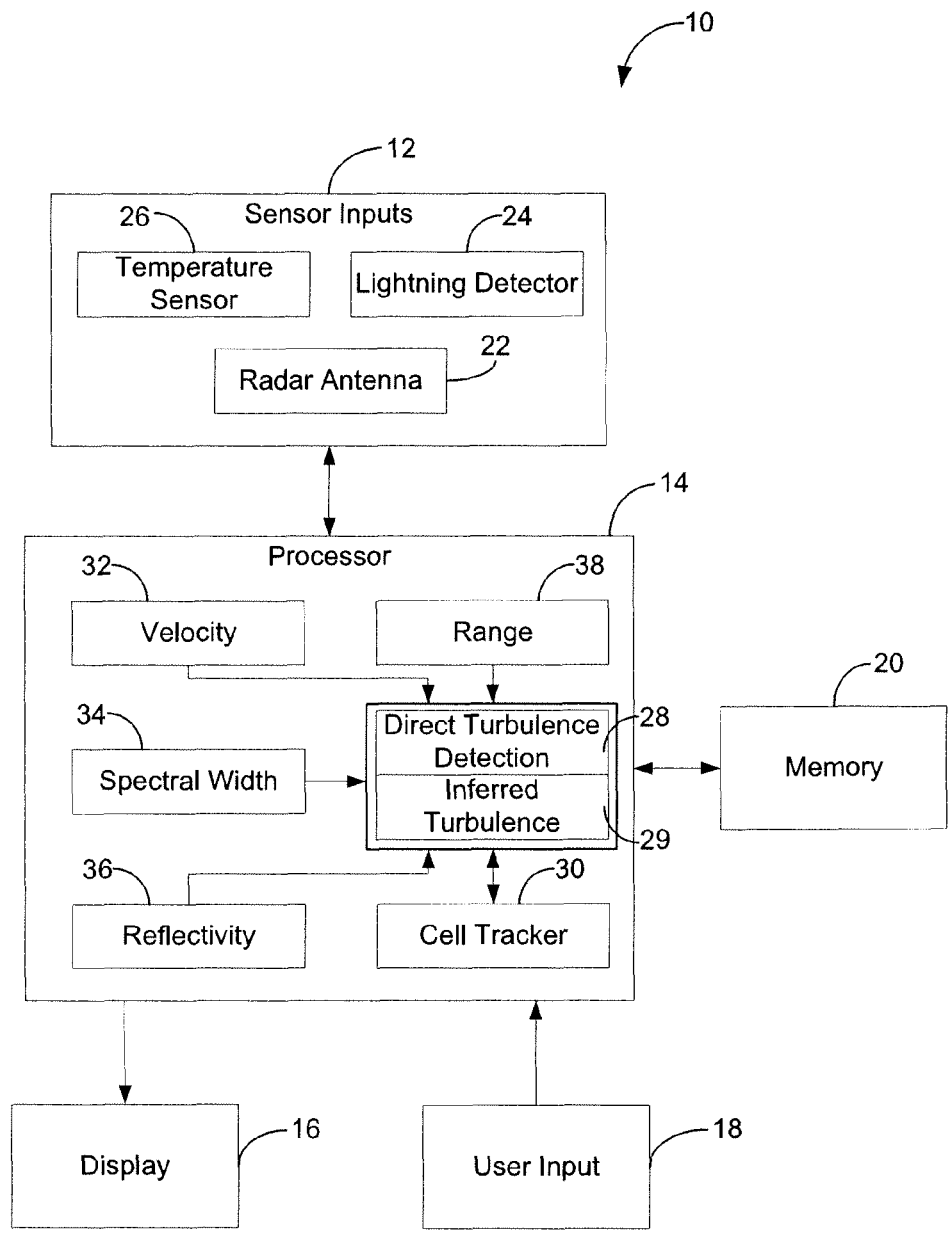
FIG. 1 is a block diagram of a hazard warning system according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

An aircraft hazard warning system or other avionic system may infer turbulence and change or adjust detection parameters as a function of other sensor information and geographical location. The hazard warning system scales reflectivity with air temperature to better represent hazards from convective cells at altitudes above the freezing layer where reflectivity tends to fall off. The weather hazards vary greatly with geography. In some geographical regions, heavy rain may be typical while convective activity that produces turbulence, hail, and lightning may be rare. In other locations, storms rain out at low altitude and reflectivity at high altitude is very low even though the high altitude turbulence above the convective area is still present. Satellite data and worldwide test flight data may allow selection of display thresholds to better characterize weather threats at different geographic locations.

By providing better weather interpretation, the hazard warning system may infer true aircraft hazards such as hail, lightning, and turbulence from more basic sensor information. In the specific case of turbulence, the basic sensor information (e.g., radar measured spectral width) does not change with geographical location. The inferred turbulence, however, does change with geographical location.

The current regulatory environment as defined by governmental regulatory agencies supports display of basic radar sensor information as red, yellow, and green for radar reflectivity calibrated to rainfall rate and magenta as turbulence. The regulatory agencies do not currently provide guidance for changing the definition of the radar display based on inferred hazards. The radar display format may be selected to display radar colors consistent with turbulence and rainfall rate as currently defined by regulatory authorities or as defined in the future by such authorities. A hazard assessment indication can be provided in a manner that does not interfere with display of standard weather data.

Referring to FIG. 1, a weather radar system or hazard warning system 10 includes sensor inputs 12, a processor 14, a display 16, a user input 18, and a memory 20. Hazard warning system 10 may acquire horizontal and/or vertical reflectivity profiles and direct turbulence detection information via sensor inputs 12. Sensor inputs 12 generally include a radar antenna 22, a lightning detector 24, and a temperature sensor 26. According to other exemplary embodiments, sensor inputs 12 may include any type of sensor or detector that may provide data related to direct or inferred measurement or detection of weather conditions and/or hazards.

Lightning detector 24 may be an airborne lightning sensor that provides polarity, strike rate, range, bearing, strike strength, lightning type (e.g., cloud to cloud, cloud to ground, etc.), and rate history for each lightning flash relative to the aircraft. Detector 24 can derive a range interval from the amplitude information. Lightning detector 24 is a lightning sensor that can be integrated within system 10 or be a separate unit from system 10. Lightning detector 24 can be aboard the aircraft associated with system 10 or can be an onboard system communicating wirelessly with system 10.

Alternatively, lightning data can be provided from ground based systems or other systems not aboard the aircraft. The lightning data can be correlated with respect to the preset location of the aircraft for comparison with other weather data sensed by other sensors, such as weather radar systems, optical sensors, etc.

Detector 24 preferably provides lightning data indicative of the presence and/or location of lightning strikes. The lightning data can be raw data from detector 24 or processed data that indicates a location and presence for each lightning strike and the rate of lightning strikes in a given cell. In one embodiment, the lightning data points toward or indicates the bearing of detected lightning strikes. The lightning sensor may also provide inferential information related to turbulence and/or hail.

Lightning detector 24 is preferably a Storm Scope™ lightning sensor, narrow band optical imaging system, or other sensor for determining the presence of lightning strikes. Detector 24 preferably also provides a bearing to lightning strikes and an estimated location of lightning strikes. Detector 24 may also provide lightning strike rate, polarity of lightning strike and lightning strike type: cloud-to-ground, cloud-to-cloud, etc. In one example, the lightning detector can be an LD-250 lightning detector configured for communication with detector processor 14.

In one embodiment, detector 24 provides the data in range and azimuth form to processor 14 indicating the location and presence of lightning strikes or at least the bearing from the aircraft to the lightning strike. Alternatively, processor 14 can obtain raw data from lightning detector 24 and determine presence and location of lightning strikes from the raw data.

Detector 24 can be a detector purchased from Boltek Company or L3 modified to be used with system 10. In one embodiment, detector 24 is simplified by only providing angle to lightning strike information so that detector 24 can be of a simpler and less expensive wideband ADF design.

An antenna for detector 24 can be located at a base of a pedestal boom and utilize the pedestal power associated with aircraft hazard warning system 10 and its interface to a remote or wireless radar transceiver circuit. In addition, the antenna for detector 24 can use the current weather radar mechanical pedestal structure associated with radar antenna 22.

The hybrid approach of hazard warning system 10 correlates radar reflectivity and lightning data to overcome the shortcomings of the lightning strike inaccuracy. The hybrid approach determines lightning strike position relative to radar reflectivity measurements, with sufficient accuracy, to make a convective assessment on a weather event.

Processor 14 is generally configured to process data received from sensor inputs 12 to determine a hazard threat level, receive input from user input 18, and provide hazard indication on display 16. Processor 14 includes turbulence detector 28, inferred turbulence detector 29, and cell tracker 30. Processor 14 can generate a velocity parameter 32 or other Doppler data, a spectral width parameter 34, a reflectivity parameter 36, and a range parameter 38 based on return data from sensor inputs 12, data or commands from user input 18, or data or instructions from memory 20. According to various exemplary embodiments, processor 14 can be any hardware and/or software processor or processing architecture capable of executing instructions and operating on data related to hazard detection. According to various exemplary embodiments, memory 20 can be any volatile or non-volatile memory capable of storing data and/or instructions related to hazard warning system 10.

Direct turbulence detector 28 is configured to provide turbulence data based on a direct measurement of spectral width, for example spectral width parameter 34, from radar antenna 22. A large spectral width corresponds to turbulence. Direct turbulence detector 28 can provide a turbulence hazard indication on display 16.

Inferred turbulence detector 29 is configured to provide inferred or unmeasured turbulence data using measured data. Inferred turbulence detector 29 can receive data inputs derived from one or more of spectral width parameter 34, reflectivity parameter 36, and/or range parameter 38.

Inferred turbulence detector 29 can also receive temperature data from temperature sensor 26 and data from lightning detector 24. Temperature data can include a local atmospheric temperature, local temperature variations with time, local temperature variations with altitude, a remotely determined temperature, and/or remotely determined temperature gradients in either range or altitude.

The detection of lightning generally indicates the presence of a convective call and of turbulence within the cell. Detection of a single lightning bolt can infer the presence of turbulence. The use of lightning history data may provide a more accurate inferred turbulence assessment. If lightning history indicates a high lightning strike rate in a given cell the probability of turbulence with high magnitude within that cell is high.

Reflectivity parameter 36 can include data related to area reflectivity, gradient reflectivity, magnitude reflectivity, reflectivity shape, and/or a sharp change in reflectivity. Very high gradients (e.g., rapid changes from red to black to yellow) can indicate the presence of a convective cell and thus turbulence. According to one exemplary embodiment, the very high gradient may be a change in cell reflectivity within a few range bins (e.g., one nautical mile). According to another exemplary embodiment, the very high gradient may be a change in cell reflectivity within three nautical miles.

If a cell is detected to be growing at a very high rate, it may be a convective cell containing turbulence. If a cell is detected that has grown at a very high rate in the past, the cell may be convective and contain turbulence. For example, the growth may be detected by a vertical structure analysis. The vertical structure analysis data may include vertical height, vertical growth rate, a vertical history assessment, an assessment of whether the aircraft path will intersect a portion of a weather cell, and/or cell maturity data.

Inferred turbulence detector 29 can process at least one of parameters 34, 36, 38 and/or data from detector 24 to provide a turbulence hazard indication on display 16. In addition, inferred turbulence detector 29 can cause system 10 to perform further analysis in response to information from lightning detector 24 and/or a parameter 34, 36, 38. The further analysis can even include causing system 10 to perform weather radar queuing and control in elevation and azimuth as well as examining new data or historical data. Inferred turbulence detector 29 can provide inferred turbulence data at longer ranges from measurements that are not directly turbulence related than direct turbulence detector 28. Advantageously, detector 29 allows system 10 to provide notice of turbulence at both short ranges (e.g., within 25 nmi, within 40 nmi, within 50 nmi, etc.) and long ranges (e.g., greater than 25 nmi, greater than 40 nmi, greater than 50 nmi, up to 75 nmi, up to 100 nmi, up to 320 nmi, etc.). Detector 29 merges turbulence analysis from direct detections and inferred detections to give an overall awareness of turbulence throughout the range of system 10.

Threat descriptions on display 16 can include lightning, hail, and turbulence. All three hazards can have substantial impact on airline operations. In one embodiment, the display of turbulence and potential lightning may be paired with entire cells and circled by a line of the normal turbulence color at lower levels of hazard. Regions of likely lightning and directly measured turbulence may use either a solid second level turbulence color or be encoded with an icon. Preferably, display 16 allows slewing from the full cell identification of convective weather at long ranges to a shorter range sub-cell size regions of likely hazard.

After acquiring data from sensor inputs 12, processor 14 may use a variety of processing techniques to assess the weather hazard level. Processor 14 may identify and track relevant weather cells via cell tracker 30. The cells may be prioritized in terms of their threat to the aircraft and detailed vertical scans can be conducted on high priority targets.

Conventional radar systems scale return power to display color without regard to the nature of the weather target being scanned. In contrast, hazard warning system 10 scales its return power system with respect to a height above the freezing layer as well as by geographic location. At low altitudes, liquid precipitation may produce very high radar reflectivity. As altitude increases, the temperature and corresponding radar reflectivity generally undergo a decrease. At cruise altitudes where hazard warning system 10 is primarily scanning ice crystals, the radar reflectivity may drop two or more color levels or disappear entirely from the display. Processor 14 uses outside air temperature measurements to estimate height relative to the freezing layer where highly reflective water droplets change to more poorly reflective ice crystals. Processor 14 can automatically modify the display color thresholds to provide a more uniform measure of the atmospheric moisture content regardless of whether the moisture occurs as ice or liquid water.

Weather cell reflectivity also varies with geographical location. For example, equatorial oceanic weather cells tend to have significantly different characteristics than continental and convective land based weather. Oceanic cells on the average have 23 dBZ (two and ½ color levels) less reflectivity at cruise altitudes than equivalent land based cells. This translates to only 1/200th as much radar echo from oceanic weather as compared to weather over land. This difference causes oceanic weather to be essentially invisible to conventional radar systems at cruise altitudes even though turbulence hazards may still exist high in a convective cell or storm.

Though the weather cell reflectivity varies with geographical location, the hazards associated with convective activity remain similar across the world. Processor 14 compensates for localized weather reflectivity profiles by automatically modifying operating parameters (e.g., antenna beam tilt, color thresholds, etc.) based on aircraft position data. These adjustment techniques complement existing government regulatory documentation that defines color levels based on rainfall rate. Since the hazard warning system 10 compensates weather trends due to geographical location, it provides a more accurate assessment of the atmospheric moisture content and thus, a more accurate representation of the weather threats.

Knowing the vertical extent of a weather cell can aid a pilot's decision whether to proceed through, or maneuver around a cell. Weather cell tops generally produce weak radar returns. Conventional radars sample weather cell tops using radar beams that are large in diameter with respect to the vertical accuracies desired. These two constraints may require a radar design that carefully optimizes the sampling in the upper regions of storm cells.

Some radars have used a multi-elevation process to estimate the vertical characteristics of weather cells. In order to minimize latency this multiple bar method may only perform a few horizontal scans separated by several degrees and still spend most of its time scanning empty space. The coarse spacing in elevation that produces acceptable latencies provides poor vertical accuracy when mechanized to detect storm top and storm growth.

Hazard warning system 10 may surpass the limitations of the multi-elevation process by separating the horizontal and vertical scanning and assessment process. Hazard warning system 10 may automatically identify weather cells and direct dedicated, fully stabilized vertical scans for each tracked weather cell to provide a high resolution assessment of each cell's vertical extent. Weather cell vertical scans may be prioritized based on their threat to the aircraft. Flight path segments, aircraft track angle, and/or pilot directed scan angles may be similarly scanned and estimated. Weather cells and any flight path or pilot commanded headings may be continuously rescanned to provide timely information.

In addition to direct reflectivity and turbulence data, hazard warning system 10 can utilize lightning detector 24 to directly sense lightning threats to the aircraft. Conventional airborne lightning sensors are generally proficient at detecting the direction of the electrical discharges, but are generally poor at determining range to the discharge. Since lightning is typically associated with convective weather cells, processor 14 can identify regions of reflectivity along the heading indicated by lightning detector 24 and correct the lightning sensor range estimates to the nearest convective cells.

Processor 14 uses the presence of lightning to infer information about hail. Weather cells that do not have enough updraft energy to produce lightning typically do not produce hail. According to another exemplary embodiment, radar return strength combined with temperature and altitude information can be used to infer hail. If a height of 1.4 km above the zero degree centigrade point in the atmosphere has radar reflectivity greater the 45 dBZ, hail formation may be likely. The temperature/altitude algorithm may be used to infer both the likelihood of hail and the likely maximum hail diameter.

The presence of lightning within a weather cell may be sufficient to identify the cell as turbulent. Lightning is the result of atmospheric charge separation. The charge separation occurs as the result of friction between particles in regions of strong, turbulent, and/or shearing winds. Since lightning can be detected and correlated with storm cells at ranges of 100 miles or more, lightning detection can be used as an inferential turbulence indicator at ranges beyond the ability of radars using only conventional spectral width estimates.

Figure 2:
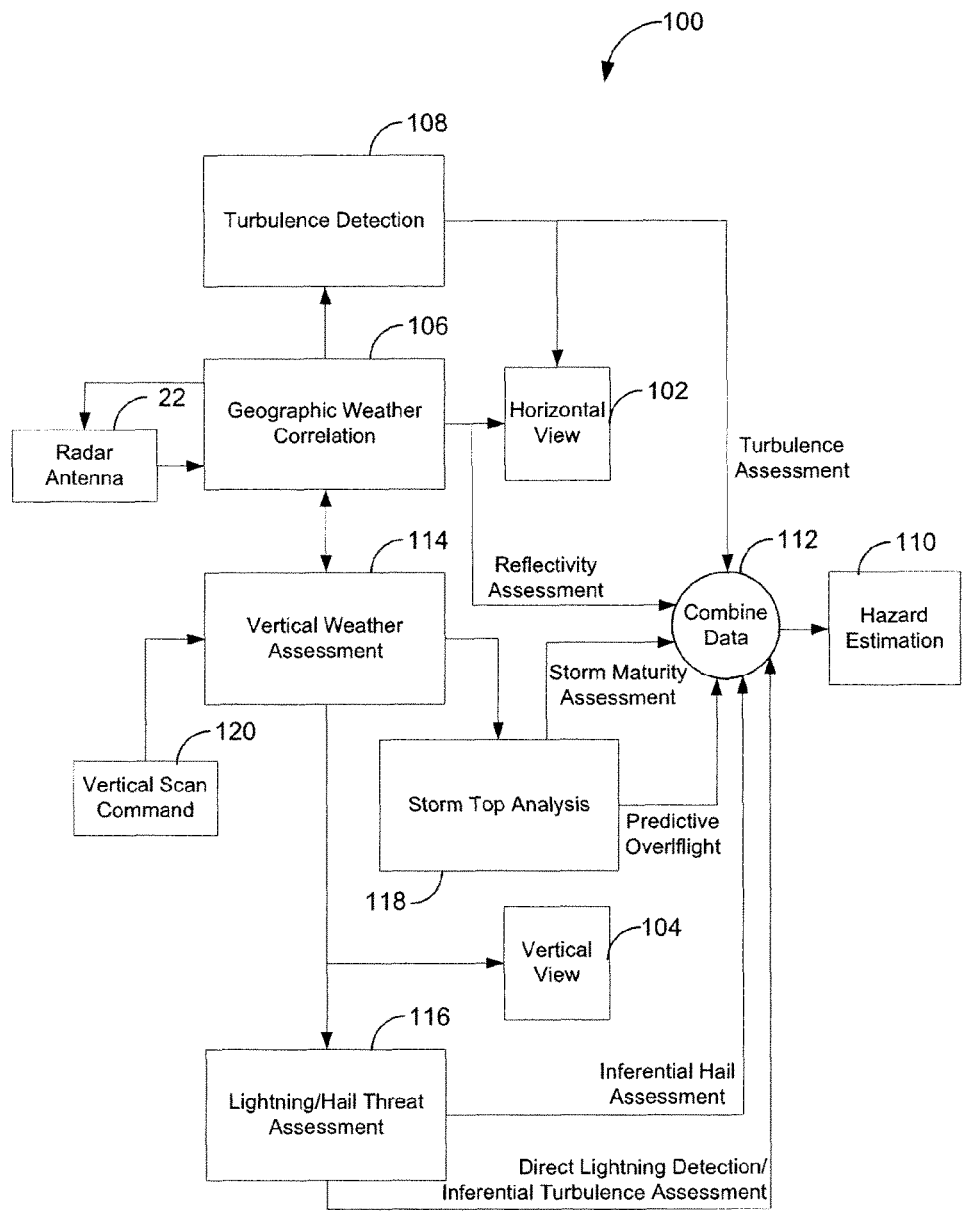
FIG. 2 is a functional flow diagram of various processes executed in the hazard warning system of FIG. 1 according to an exemplary embodiment.

Referring to FIG. 2, a radar processing functional flow 100 of hazard warning system 10 is illustrated. The display 16 is divided into a horizontal view 102 and a vertical view 104. The two independent views 102, 104 may include independent mode, range, and gain parameters.

The weather depiction on horizontal view 102 includes color patterns consistent with typical rainfall rate displays except the radar reflectivity is corrected to normalized atmospheric moisture content as described previously. Turbulence is sensed based on radar spectral width and scaled to aircraft RMS vertical load.

A hazard estimation 110 is generated from the sum or other combination 112 of the data outputs from measured and inferred functions including direct turbulence detection (process 108), reflectivity measurement (process 106), lightning and inferred turbulence measurement (process 116), hail probability assessment (process 116), and/or storm growth assessment (process 118 and process 114) in order to generate an overall hazard assessment at each horizontal location. Each of the measurements or assessments from processes 106, 114, 116, and 118 may individually or in any combination provide an assessment of an inferred turbulence hazard. The assessment can be depicted on horizontal view 102 as an icon or as a specific color. The icon may be transparent to the underlying red/yellow/green radar display and capable of being turned off. Other exemplary embodiments may include textual blocks depicting tops of tracked storm cells and/or dithered regions that alert the crew to storms growing into the flight path (e.g., predictive overflight).

The hazard assessment display can be any combination (e.g., linear or nonlinear combination) of all the inputs. Alternately, each individual hazard component (e.g., lightning, inferred turbulence, direct turbulence, inferred hail, etc.) may be displayed individually.

Hazard warning system 100 identifies storm cells (process 114) and may automatically direct vertical scan commands 146 toward the cells in order to better assess the convective nature, maturity, and/or probability of the aircraft intercepting the cell top or turbulent bow wave above the cell (process 118). Process 114 prioritizes the directed vertical scan commands 146 based on the threat to the aircraft. The factors considered in cell prioritization may include crew selected vertical scan or automated directed scan history, cell reflectivity, cell hazard potential, cell proximity to the aircraft, cell proximity to the current track, cell proximity to the FMS flight path, etc.

The cell prioritization may be applicable to automatically directed vertical or horizontal scans. A vertical scan associated with the crew selected vertical scan (e.g., vertical scan command 120) may be the highest priority vertical function.

Vertical view 104 shows vertical cutsets along the flight plan, track angle, and/or crew commanded azimuth angle (process 114) as a result of the crew selecting a vertical scan command 120. The colors generally represent rainfall rate with reflectivity scaled to atmospheric moisture content in the same way as in horizontal view 102. Other exemplary embodiments may include an icon depiction of storm top uncertainty and/or an icon arrow that shows growth rate.

Figure 3B:
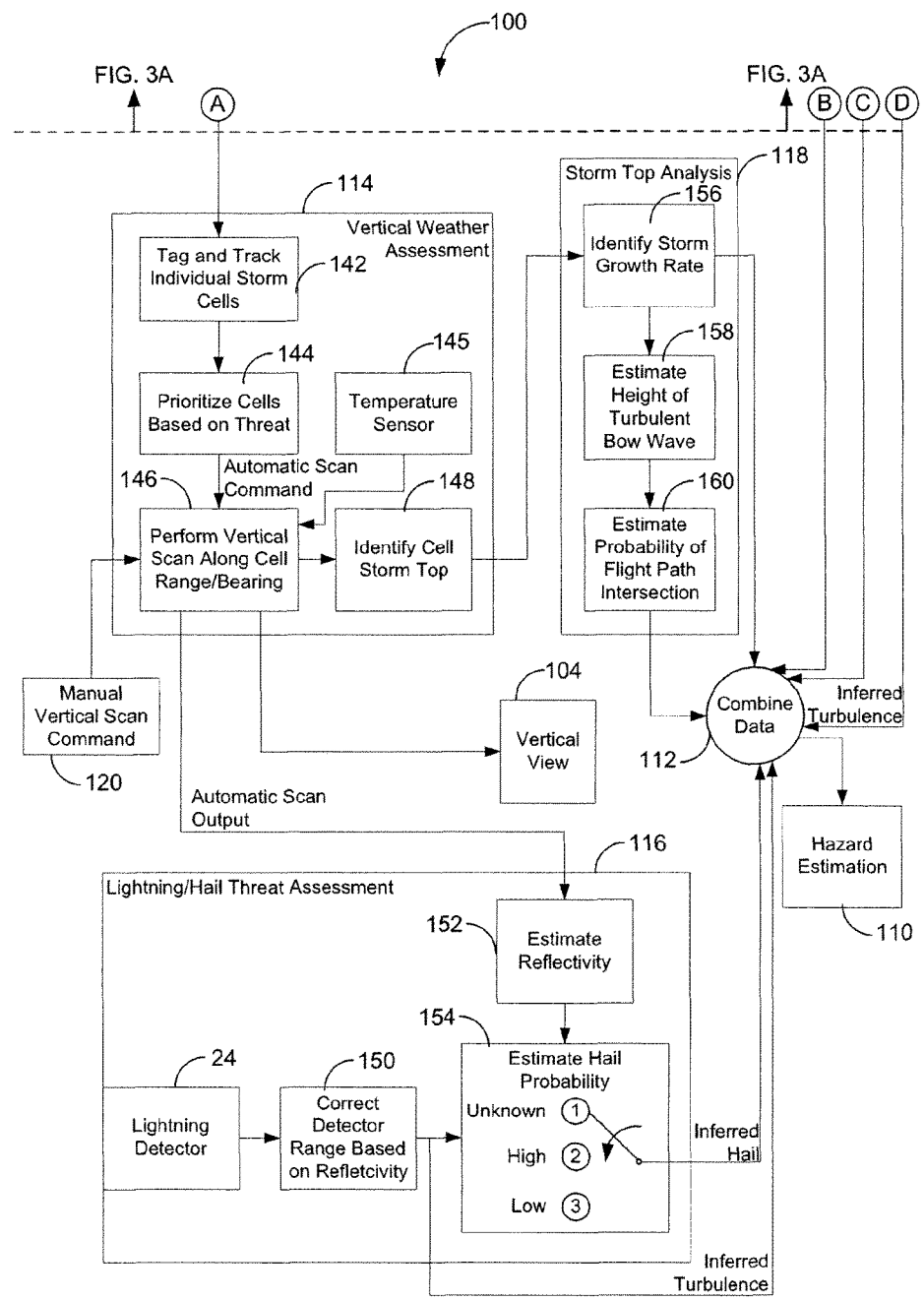

Referring to FIGS. 3A and 3B, a more detailed version of radar processing functional flow 100 of FIG. 2 is illustrated. In the geographic weather correlation process 106, the tilt of radar antenna 22 may be controlled (step 122). The power of the radar returns from antenna 22 are computed (step 124) and corrected for reflectivity falloff (step 126), for example due to elevation above a freezing layer or geographic location as shown in chart 500 of FIG. 7 or chart 600 in FIG. 8. Return power for multiple antenna 22 tilts is compared to suppress ground clutter and false returns (step 128). The radar power is corrected for range (step 130) and an overflight protection algorithm is run (step 132) that retains power data at specified ranges, for example less than ten nautical miles. Based on the overflight protection data (step 132) and the corrected power (step 130), color thresholds are applied based on regulatory specifications (step 134), as described above, for display on horizontal view 102 and for output as a reflectivity assessment to data combination 112. Cell area and reflectivity gradient are assessed (step 135) in order to generate and inferred turbulence assessment which is provided to data combination 112.

In the turbulence detection process 108 (e.g., direct turbulence detection), the computed return power (step 124) is used to compute the spectral width of the return (step 136). The spectral width is used to estimate the turbulence in units scaled to the aircraft RMS vertical load (step 138). Color thresholds are applied to the turbulence estimate based on regulatory specifications (step 140), for display on horizontal view 102 and for output as a turbulence assessment to data combination 112.

The vertical weather assessment process 114 tags and tracks individual storm cells (step 142) based on the corrected power from the geographic weather correlation process (step 130). The storm cells are prioritized based on the threat to the aircraft (step 144). Based either on a manual vertical scan command or an automatic scan command, system 10 performs a vertical scan along a cell range and bearing (step 146). If the vertical scan was manually commanded by the crew (step 120) the vertical scan data is output to vertical view 104 for display and use by the crew. If the vertical scan was an automatic scan, the data is also output to the lightning/hail threat assessment process 116. The vertical scan data is also used to identify the top of the storm cell (step 148).

Lightning/hail threat assessment process 116 uses lightning detector 24 to gather lightning data. The range of detector 24 is corrected based on radar reflectivity considerations (step 150). The range-corrected data is output to data combination 112 as a direct lightning detection and/or an inferential turbulence detection assessment. The automatic scan output data (step 146) is used to estimate the reflectivity at a specified distance above or below the freezing layer (step 152), for example 1.4 km above the freezing layer. Based on the reflectivity estimate (step 152) and the corrected data (step 150), system 10 makes an estimate of hail probability (step 154). The probability decision is at an unknown state by default and may change to a state of high probability if the reflectivity estimate is greater than a predetermined threshold, for example if the reflectivity estimate 1.4 km above the freezing layer is greater than 45 dBZ. If there is no lightning detected the hail probability changes to a low probability state. The estimated hail probability is output as an inferential hail assessment to data combination 112.

Storm top analysis process 118 uses the identified cell storm top data (step 148) and identifies the storm growth rate (step 156). The storm growth rate data is output as a storm maturity assessment to the data combination 112 and used to estimate the height of a turbulent bow wave associated with the storm cell (step 158). System 10 then estimates the probability that the aircraft flight path will intersect the turbulence bow wave or storm cell (step 160) and outputs the estimate as a predictive overflight assessment to combined data 112.

Hazard estimation 110 is generated from the sum or other combination 112 of the measured and inferential data to generate an overall weather hazard assessment. The assessment can be depicted on horizontal view 102 as an icon or specific color. The icon may be transparent to the underlying red/yellow/green radar display and capable of being turned off. Other exemplary embodiments may include textual blocks depicting tops of tracked storm cells and/or dithered regions that alert the crew to storms growing into the flight path (e.g., predictive overflight).

According to an exemplary embodiment, combination 112 operates as a logical OR function with respect to inferred turbulence determined from a radar reflectivity measurement, lightning measurement, hail probability assessment, storm growth or vertical structure analysis assessment, geographic location data, and/or temperature data. Alternatively, any combination 112 can operate as a logical AND function with respect to certain types of assessments or parameters, certain types of assessments or parameters at certain ranges, or certain types of assessments or parameters at certain altitudes. These and other logical functions (e.g., NOR, NAND, XOR, etc.) can be combined in any manner to provide the most appropriate inferred turbulence indication.

Cell reflectivity, after being compensated for temperature at altitude and geographical location, may be used for cell identification and tracking. According to one exemplary embodiment, the cell tracking algorithm may store and/or track about 32 individual cells. According to other exemplary embodiments, more or fewer than 32 individual cells may be stored and/or tracked.

Cell reflectivity may be used in cell hazard assessment but other factors such as presence of lightning, presence of turbulence, probability of hail, storm maturity, storm growth, and/or vertical extent from previous vertical scans may also be included.

Highly reflective cells within about twenty nautical miles of the aircraft may be relevant regardless of where they lie relative to the aircraft flight path or heading. Tactical decisions may force the crew to deviate from the flight path and the crew should have the best available short range radar to support these tactical maneuvers.

Beyond twenty nautical miles, highly reflective cells may be prioritized based on their proximity to the current track out to the limits of the current flight plan segment. If the current track shows significant lateral deviation from the FMS flight plan, cells can be reprioritized based on current track angle rather than flight plan angle. Highly reflective cells may be prioritized based on their proximity to flight path segments beyond the current flight segment.

Though the vertical scans (both automatic and manual) may provide useful tactical information, the vertical functions do have limitations. In general, the resolution of the vertical data being collected and displayed may have an error rate that increases with range. Three primary errors affect the radar's ability to accurately determine storm height: error due to beamwidth, error between tilt samples, and error due to the difference between radar detectible storm top and turbulent bow wave.

The 3 db two way beamwidth of an air transport class radar antenna is approximately 2.7 degrees. This angular width means the vertical height of the beam spreads with range so the height estimation error also increases with range. If the nature of a radar target is unknown, the resolution error may be $R*\tan(2.7 \deg)$ where R is the range. Since the nature of the target along with the antenna beam shape is generally known, the vertical resolution can be increased by a technique called beam deconvolution; the beam shape may be divided out of the sensed radar measurement. Beam deconvolution may allow vertical resolution to be improved by a factor of two, reducing the resolution error due to beamwidth to about $0.5*R*\tan(2.7 \deg)$.

Additional range-dependent error may be present due to the radar vertical sampling interval. Hazard warning system 10 performs vertical assessments at ⅛ degree intervals, which may results in a peak to peak vertical error of $R*\tan(0.125 \deg)$.

The radar may not be capable of directly detecting clear air hazards above convective cells. Significant turbulence may be experienced as high as 1500 meters above the radar-detectible storm top with an average clear air turbulence height of about 950 meters above the radar top. Even if an average estimate of 950 meters is added to the displayed storm top to account for the average height of the clear air turbulence, variation in clear air turbulence estimates result in a peak to peak variance of about 900 meters.

According to various exemplary embodiments, the process flow of FIGS. 2, 3A, and 3B may be embodied as hardware and/or software. In exemplary embodiments where the processes are embodied as software, the processes may be executed as computer code on any processing or hardware architecture or in any weather radar system such as the WXR-200 available from Rockwell Collins.

Figure 4:
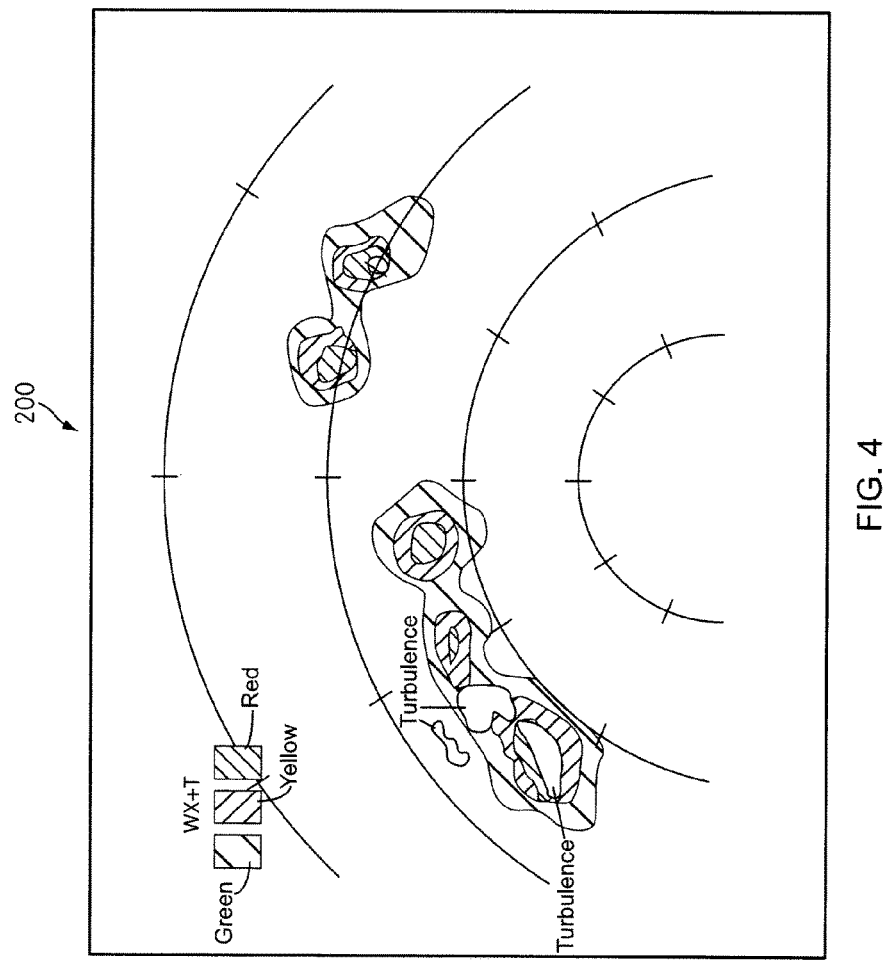
FIG. 4 is a screenshot of the horizontal display in the functional flow diagrams of FIGS. 3A and 3B according to an exemplary embodiment.

Referring to FIG. 4, a screenshot 200 of horizontal view 102 provides reflectivity scaled as moisture content and turbulence scaled to RMS vertical load according to an exemplary embodiment. The moisture content may be illustrated by the colors green, yellow, and red (represented by the legend in the FIG) and both directly measured and/or inferred turbulence may be represented as another color such as magenta. Alternatively, inferred turbulence may be represented differently than directly measured turbulence. In one exemplary embodiment, inferred turbulence may be the same color as directly measured turbulence, but the inferred turbulence indication may be stippled or cross-hatched. According to another exemplary embodiment, the inferred turbulence may be of a different color than the directly measured turbulence.

Figure 5:
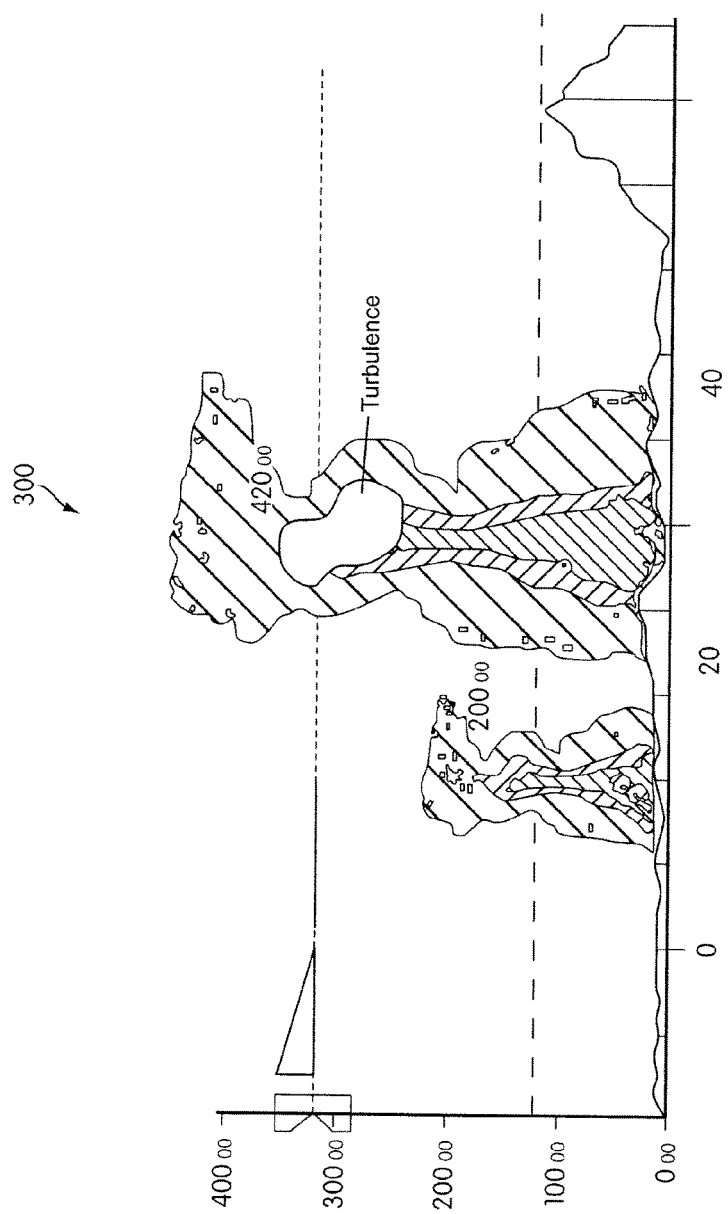
FIG. 5 is a screenshot of the vertical display in the functional flow diagrams of FIGS. 3A and 3B according to an exemplary embodiment.

Referring to FIG. 5, a screenshot 300 of vertical view 104 provides vertical reflectivity scaled as moisture content (e.g., green, yellow, and red) according to an exemplary embodiment. Screenshot 300 shows the vertical profile of two example storms with heights of 20000 and 42000 feet over a distance of about 60 nautical miles. The lower dashed line across screenshot 300 gives an estimated minimum altitude for an aircraft to fly to avoid terrain hazards.

Figure 6:
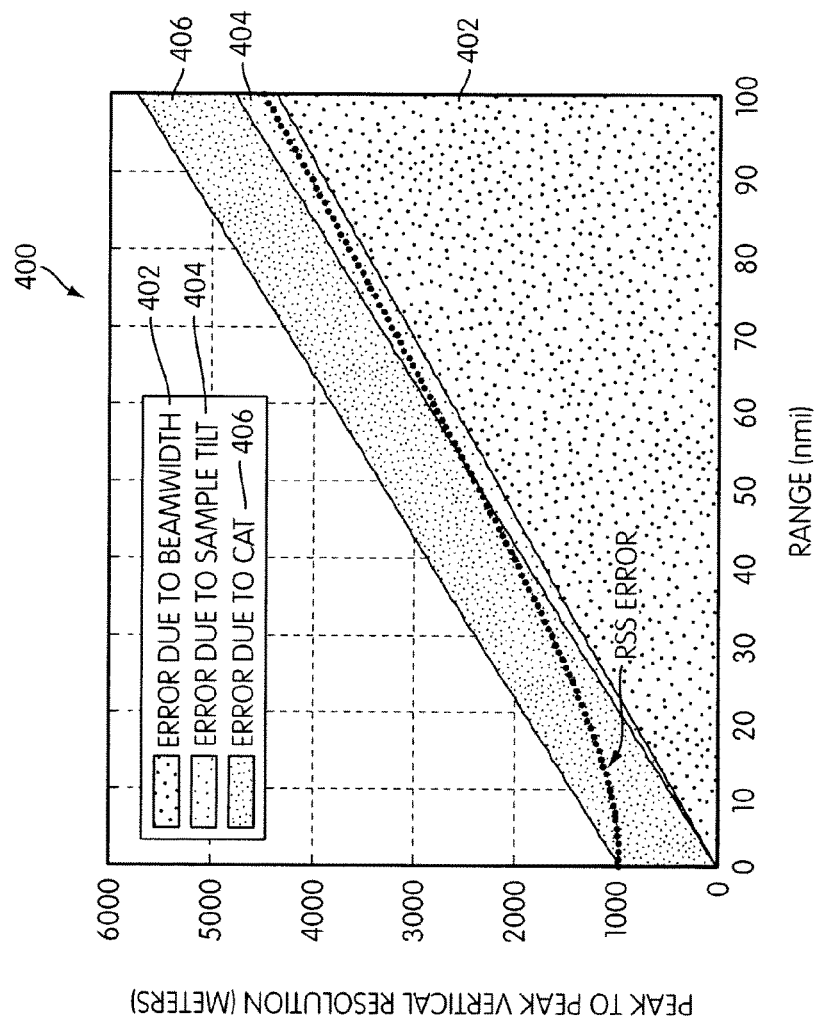
FIG. 6 is a chart showing errors corresponding to the vertical resolution of the hazard warning system of FIG. 1 according to an exemplary embodiment.

FIG. 6, shows a chart 400 of a stack up of peak-to-peak vertical resolution errors of directly measured cell height as a function of range and the associated root-sum-square (RSS) of the error. The error stack up increases with range to a degree that the inferred cell height has higher accuracy than the directly measured system. Chart 400 accounts for beamwidth resolution 402, sample resolution 404, and clear air turbulence (CAT) 406 above convective cells. At 40 nmi, an RSS resolution error of +/−1000 meters (2000 meters peak to peak) may be expected. At 100 nmi, this resolution error grows to +/−2250 meters (4500 meters peak to peak).

Figure 7:
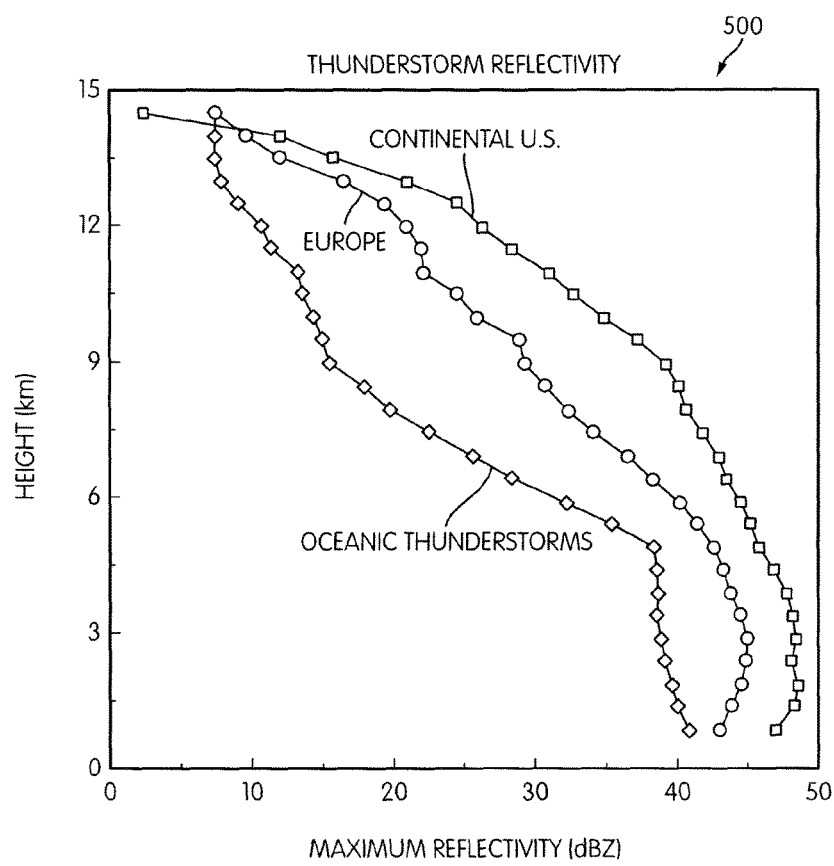
FIG. 7 is a chart illustrating how thunderstorm reflectivity may change based on geographic location and/or height according to some exemplary embodiments.

Referring to FIG. 7, a chart 500 illustrates how storm or convective cell reflectivity can change based on geographic location and/or height or elevation according to an exemplary embodiment (Zipser, E. J. and Lutz, K. R., "The Vertical Profile of Radar Reflectivity of Convective Cells," American Meteorological Society, Volume 122, Issue 8, August 1994). For example, oceanic thunderstorms or convective cells may have less reflectivity at a given temperature altitude than storms or convective cells in Europe, while storms and convective cells in Europe may have less reflectivity at a given temperature altitude than those in the continental United States. A storm or cell may also have less reflectivity at a higher elevation and greater reflectivity at a lower elevation.

The temperature altitude may be the altitude at which a given temperature is found. For example, lightning likely exists at mid latitudes when radar reflectivity exceeds 35 dBZ at the altitude where the temperature falls to −15 degrees centigrade. This may be called the −15 degree temperature altitude. A specific reflectivity at an altitude where the temperature is at or below the freezing level may indicate the presence of a convective cell and thus turbulence.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft hazard warning system using radar reflectivity data to determine a presence of hail, comprising:
    an onboard electronic processing system in communication with a radar antenna and configured to receive radar returns including radar reflectivity data and temperature data from the radar antenna and to determine a presence of hail, the electronic processing system configured to determine a first altitude associated with the zero degree centigrade point, the electronic processing system configured to determine the presence of hail when the reflectivity data indicates a reflectivity at a second altitude above the first altitude is above a first threshold, and the electronic processing system configured to provide an indication based on the determination of the presence of hail.

2. The aircraft hazard warning system of claim 1, wherein the radar reflectivity data includes or the electronic processing system determines one or more of: a target range, Doppler velocity information, a Doppler derived spectral width parameter, an area reflectivity parameter, a gradient reflectivity parameter, a vertical structure, and a magnitude reflectivity parameter.

3. The aircraft hazard warning system of claim 1, wherein the second altitude is 1.4 km above the first altitude.

4. The aircraft hazard warning system of claim 1, wherein the atmospheric temperature data includes one or more of: a local temperature, local temperature variations with time, local temperature variations with altitude, a remotely determined temperature, and remotely determined temperature gradients in either range or altitude.

5. The aircraft hazard warning system of claim 1, wherein the electronic processing system inferentially determines a maximum hail diameter.

6. The aircraft hazard warning system of claim 1, wherein the aircraft hazard warning system is for use with a display, and wherein the electronic processing system provides display data for at least one of a vertical, a horizontal, and a perspective weather depiction.

7. The aircraft hazard warning system of claim 1, wherein the first threshold is 45 dBZ.

8. A method of displaying an indication of a hazard on an aircraft display using an avionics warning system, the method comprising:
    receiving, by an electronic processing system, radar returns from an airborne radar antenna, the radar returns including radar reflectivity data and temperature data;
    determining, by the electronic processing system, a first altitude associated with the zero degree centigrade point;
    determining, by the electronic processing system, the presence of hail when the reflectivity data indicates a reflectivity at a second altitude above the first altitude is above a threshold; and
    providing, by the electronic processing system, an indication to an avionics warning system based on the determination of the presence of hail.

9. The method of claim 8, wherein the second altitude is 1.4 km above the first altitude.

10. The method of claim 8, wherein the radar reflectivity data includes or the electronic processing system determines one or more of: a target range, Doppler velocity information, a Doppler derived spectral width parameter, an area reflectivity parameter, a gradient reflectivity parameter, a vertical structure, and a magnitude reflectivity parameter.

11. The method of claim 8, wherein the atmospheric temperature data includes one or more of: a local temperature, local temperature variations with time, local temperature variations with altitude, a remotely determined temperature, and remotely determined temperature gradients in either range or altitude.

12. The method of claim 8, wherein the electronic processing system provides the indication as display data for at least one of a vertical, a horizontal, and a perspective weather depiction.

13. The method of claim 8, wherein the electronic processing system inferentially determines a maximum hail diameter.

14. The method of claim 8, wherein the electronic processing system inferentially determines a minimum hail diameter.

15. The method of claim 8, wherein the threshold is 45 dBZ.

* * * * *